April 5, 1955     J. E. HAZELTINE, JR., ET AL     2,705,683
METHOD OF MAKING PRINTED FELT BASE FLOOR COVERINGS
Filed April 10, 1952
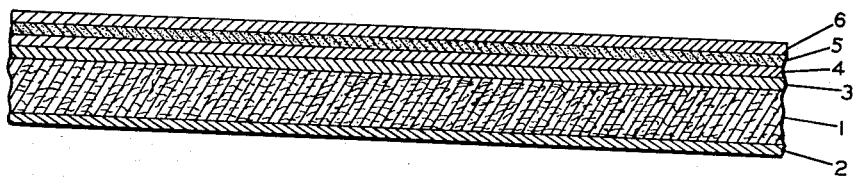
INVENTOR
JAMES E. HAZELTINE, JR.
HARRIET A. GELZENLICHTER
ATTORNEY

United States Patent Office 2,705,683
Patented Apr. 5, 1955

2,705,683

METHOD OF MAKING PRINTED FELT BASE FLOOR COVERINGS

James E. Hazeltine, Jr., and Harriet A. Gelzenlichter, Lancaster, Pa., assignors to Armstrong Cork Company, Lancaster, Pa., a corporation of Pennsylvania Application April 10, 1952, Serial No. 281,624

3 Claims. (Cl. 117—14)

This invention relates to printed felt base floor coverings. More particularly, the invention relates to printed felt base floor coverings produced by a method in which a vinyl resin decorative wearing surface is applied to a previously-coated saturated felt base by block printing and the resulting product is subjected to comparatively high temperatures to produce a smooth wearing surface of fused vinyl resin.

Felt base floor coverings are well known to the art. Generally speaking, they have been produced by coating a sheet of saturated felt, which may be asphalt-saturated felt, with a backing paint and a coating paint to provide a smooth surface for deposit thereon of a decorative wearing surface. The coating paints heretofore used have been oleoresinous varnishes and are generally applied by means of a knife coating operation. The thus coated saturated felt is then slowly passed through a block printing machine in which a series of blocks applies various colors to the coated felt in a series of color areas which flow out to produce a decorative wearing surface in a sharply-defined pattern. Ordinarily the print paint, which is the term commonly used in the art to describe the material used to form the decorative wearing surface, has been an oleoresinous material, or in some cases synthetic resin varnishes.

Although these materials have been sold for a number of years and have met with public acceptance, because of the nature of the block printing process it was not possible to utilize a number of the more recently developed synthetic resins which possessed highly desirable characteristics from the standpoint of a decorative wearing surface in a felt base floor covering. For example, the vinyl resins, such as polyvinyl chloride, copolymers of vinyl chloride and vinyl acetate containing about 5% to 15% by weight of polymerized vinyl acetate, copolymers of vinyl chloride with vinylidene chloride, and the like, could not be used because they were not adapted to use in the block printing machines.

Recently there has been developed a method of producing felt base floor coverings utilizing a decorative wearing surface produced by block printing a dispersion of vinyl resin onto an asphalt-saturated felt base utilizing the conventional block printing equipment. However, in order to obtain the required smooth hard wearing surface film, it was necessary to subject the resulting coated felt to comparatively high temperatures in order to fuse the vinyl resin film which formed the decorative wearing surface. Since the fusion temperatures required were much higher than those normally employed in the stoving of conventional printed felt base floor coverings, numerous problems developed, particularly one which we have found to result from the emission of volatile material by the asphalt saturant which caused blisters beneath the vinyl resin decorative wearing surface during the fusion step and resulted in an undesirable appearance of the wearing surface.

We have found that such damage to the vinyl resin decorative wearing surface during fusion can be substantially completely eliminated by providing a particular system of coating the asphalt saturated felt base prior to the application of the decorative wearing film thereto by the block printing technique.

A preferred embodiment of our invention is illustrated in the accompanying drawing, which is a vertical sectional view of a piece of felt base floor covering made in accordance with our invention.

In the drawing, 1 represents an asphalt-saturated felt which may be produced by passing the sheet through a bath of asphalt in a well-known manner.

Following formation of the saturated sheet 1, a backing paint 2, which may be any of the conventional backing paints, such as a casein paint, is applied to one side of the saturated felt. To the uncoated side of the saturated felt is then applied, by any suitable means, such as a knife coater, a film 3 containing butadiene-styrene copolymer which functions as a size coat. The butadiene-styrene copolymer may be deposited from an aqueous dispersion containing the same. Particularly advantageous results have been obtained when the size coat is comprised of a copolymer produced by emulsion polymerization of a mixture containing about 40% to 70% by weight butadiene and 60% to 30% by weight styrene. After drying the thus coated sheet of felt, a coating paint 4 is knife coated thereon. Any of a number of conventional coating paints may be used, such as an oleoresinous varnish produced by oxidizing linseed oil in the presence of a resin and dissolving the product in a suitable solvent. Over the coating paint 4 is provided an adhesive coating paint 5, which is advantageously a filled coating in which the binder is a blend of butadiene-acrylonitrile rubber and polyvinyl chloride. Generally speaking, the binder contains about 20% to about 75% by weight polyvinyl chloride and about 80% to about 25% by weight butadiene-acrylonitrile rubber. Such adhesive coating paints are described in copending application Serial No. 277,584, filed March 20, 1952, by Irving I. Bezman and Daniel D. Browning. As disclosed in said application, advantageous results are obtained when the adhesive coating paint contains about 20% to about 50% rubberlike polymer-resin mixture and about 80% to about 50% inert filler; the binder mixture advantageously contains about 25% to 80% rubberlike polymer and about 75% to 20% reinforcing resin. If less than about 25% rubberlike polymer is employed, the coating paint does not key well to the saturated felt base. If less than about 20% reinforcing resin is contained in the coating paint, a good key between the paint and the vinyl resin decorative coat is not obtained. Particularly advantageous results have been obtained with compositions containing 40% to 65% rubberlike polymer and 60% to 35% reinforcing resin. As to the quantity of inert filler, with less than about 50% filler the desired "tooth" or mechanical bond between the coating paint and adjacent surfaces is not obtained. However, when more than about 80% filler is used, the coating paint possesses very little internal strength. Typical examples of tackifiers and reinforcing agents which may be used are the following:

A. Tackifiers

1. A styrene-butadiene copolymer containing 30–60 parts of styrene and 70–40 parts of butadiene.
2. An acrylonitrile-butadiene copolymer containing 55–80 parts of butadiene and 45–20 parts of acrylonitrile.
3. An isobutylene-isoprene copolymer containing 97–99 parts of isobutylene with 3–1 parts of isoprene.
4. A polychloroprene.

B. Reinforcing agents

1. Polyvinyl chloride.
2. A copolymer of polyvinyl chloride and polyvinyl acetate containing 95–80 parts of polyvinyl chloride with 5–20 parts of polyvinyl acetate.
3. A polyvinyl chloride-polyvinylidene chloride copolymer containing a majority of polyvinylidene chloride.
4. A styrene-butadiene copolymer containing 98–80 parts of styrene with 2–20 parts of butadiene.
5. Polystyrene.

Various combinations of tackifier with reinforcing agent have been used and found to be successful for the purpose. The preferred binder formulations contain 35–60 parts of polyvinyl chloride with 65–40 parts of a butadiene-acrylonitrile copolymer containing 65 parts of butadiene and 35 parts of acrylonitrile. Best results were obtained with a ratio of 55 parts of polyvinyl chloride together with 45 parts of the butadiene-acrylonitrile copolymer. A second preferred composition contains 50–80 parts of a butadiene-acrylonitrile copolymer (65 parts of butadiene—35 parts of acrylonitrile) with 50–20 parts of a resinous copolymer of vinyl chloride and vinylidene chloride. Best results were obtained with a ratio of 70 parts of the butadiene-acrylonitrile copolymer together with 30 parts of resinous copolymer.

In each instance about 1 to 4 parts of an inert filler, such as wood flour, micronized slate, whiting, clay, and the like, are employed for 1 part of the binder or resin-rubberlike polymer mixture.

The thus prepared sheet is then passed through conventional block printing machines, and over the adhesive coating paint 5 is block printed a decorative wearing surface by successive applications of desired colors. The decorative wearing surface 6 is advantageously a dispersion of vinyl chloride-vinyl acetate copolymer resin or a polyvinyl chloride resin in the form of an organosol. Such decorative wearing surface print paints are described in copending application Serial No. 207,576, filed January 24, 1951, and now Patent No. 2,624,682, by James E. Hazeltine, Jr., a typical formulation being as follows:

| | Parts by weight |
|---|---|
| Titanium dioxide pigment | 80 |
| Lead chromate pigment | 16 |
| Dioctyl phthalate plasticizer | 136 |
| Vinyl chloride-vinyl acetate copolymer resin | 410 |
| Mineral spirits | 110 |
| Butylated urea-formaldehyde resin (60% solids in 50–50 butanol xylene) | 13.8 |

The titanium dioxide and lead chromate serve as coloring matter for the coating dispersion and the dioctyl phthalate as a plasticizer for the vinyl copolymer, the latter serving as the film-forming resin.

Following the printing operation, the floor covering is passed through a fusion chamber in which the material is heated at substantially elevated temperatures, such as about 280° F. to about 350° F. to fuse the wearing surface coating and provide a hard smooth film.

Following the fusion step, the floor covering is rolled and is ready for transfer to inspection.

It is believed that the size coat prevents blistering because it provides a highly impervious barrier which prohibits gases evolved from the asphalt-saturated felt at the high fusion temperatures from passing through the barrier and to a point directly beneath the decorative wearing coat. Without the size coat, the products when subjected to the high fusion temperatures develop numerous blisters which are believed to be caused by this gas evolution.

We claim:
1. In the manufacture of printed felt base floor covering by a process which includes coating a sheet of asphalt-saturated felt with an oleoresinous coating; applying an adhesive coating containing about 20% to about 50% binder and about 80% to about 50% inert filler, said binder including about 25% to about 80% tackifier selected from the group consisting of styrene-butadiene copolymers, acrylonitrile-butadiene copolymers, isobutylene-isoprene copolymers, and polychloroprene, and about 75% to 20% reinforcing agent selected from the group consisting of polyvinyl chloride, copolymers of polyvinyl chloride and polyvinyl acetate, copolymers of polyvinyl chloride and polyvinylidene chloride, styrene-butadiene copolymers, and polystyrene over said oleoresinous coating; block printing a decorative vinyl resin coating over said adhesive coating; and fusing said block printed vinyl resin film, the improvement comprising coating said impregnated felt with a butadiene-styrene copolymer size coat prior to application of said oleoresinous coating, whereby blistering of the decorative vinyl film during fusion at temperatures of about 280° F. to about 350° F. is prevented.

2. A method of making a felt base floor covering comprising coating a sheet of asphalt-impregnated felt with a size coat of butadiene-styrene copolymer; applying an oleoresinous coating paint to said size coat; applying to said coating paint an adhesive coating containing about 80% to about 50% by weight inert filler and about 20% to about 50% by weight binder including about 25% to about 80% by weight of a tackifier selected from the group consisting of styrene-butadiene copolymers, acrylonitrile-butadiene copolymers, isobutylene-isoprene copolymers, and polychloroprene, and about 75% to about 20% by weight of a reinforcing agent selected from the group consisting of polyvinyl chloride, copolymers of polyvinyl chloride and polyvinyl acetate, copolymers of polyvinyl chloride and polyvinylidene chloride, styrene-polyvinyl chloride and polyvinylidene chloride, styrene-butadiene copolymers, and polystyrene; block printing a vinyl resin decorative wearing film over said adhesive coat; and fusing said wear film at a temperature between about 280° F. and about 350° F.

3. A method of making a vinyl resin floor covering comprising coating a sheet of asphalt-impregnated felt with a size coat of butadiene-styrene copolymer; applying an oleoresinous coating paint to said size coat; applying to said coating paint an adhesive coating containing about 80% to about 50% by weight inert filler and about 20% to about 50% by weight binder including about 40% to about 65% by weight tackifier selected from the group consisting of styrene-butadiene copolymers, acrylonitrile-butadiene copolymers, isobutylene-isoprene copolymers, and polychloroprene, and about 60% to about 35% by weight reinforcing agent selected from the group consisting of polyvinyl chloride, copolymers of polyvinyl chloride and polyvinyl acetate, copolymers of polyvinyl chloride and polyvinylidene chloride, styrene-butadiene copolymers, and polystyrene; block printing a vinyl chloride resin decorative wearing film over said adhesive coat; and fusing said film at a temperature between about 280° F. and about 350° F.

References Cited in the file of this patent

UNITED STATES PATENTS

| 2,133,886 | Beegle | Oct. 18, 1938 |
| 2,330,353 | Henderson | Sept. 28, 1943 |
| 2,554,899 | Cowgill | May 29, 1951 |
| 2,589,502 | Lurie | Mar. 18, 1952 |
| 2,624,683 | Bezman | Jan. 6, 1953 |